US012563344B2

(12) United States Patent
Niidera

(10) Patent No.: US 12,563,344 B2
(45) Date of Patent: Feb. 24, 2026

(54) SPEAKER DEVICE

(71) Applicants: PIONEER CORPORATION, Kanagawa (JP); TOHOKU PIONEER CORPORATION, Tendo (JP)

(72) Inventor: Shintaro Niidera, Tendo (JP)

(73) Assignees: PIONEER CORPORATION, Kawasaki (JP); TOHOKU PIONEER CORPORATION, Tendo (JP)

( * ) Notice: Subject to any disclaimer, the term of this patent is extended or adjusted under 35 U.S.C. 154(b) by 0 days.

(21) Appl. No.: 18/764,953

(22) Filed: Jul. 5, 2024

(65) Prior Publication Data

US 2024/0365065 A1 Oct. 31, 2024

Related U.S. Application Data

(63) Continuation of application No. 18/305,619, filed on Apr. 24, 2023, now Pat. No. 12,058,502, which is a continuation of application No. 17/716,736, filed on Apr. 8, 2022, now Pat. No. 11,671,758, which is a continuation of application No. 17/069,439, filed on Oct. 13, 2020, now Pat. No. 11,337,004, which is a continuation of application No. 16/542,614, filed on Aug. 16, 2019, now Pat. No. 10,841,705, which is a continuation of application No. 15/882,137, filed on Jan. 29, 2018, now Pat. No. 10,433,065, which is a continuation of application No. 15/637,338, filed on (Continued)

(51) Int. Cl.
*H04R 7/22* (2006.01)
*H04R 9/06* (2006.01)

(52) U.S. Cl.
CPC ................. *H04R 7/22* (2013.01); *H04R 9/06* (2013.01); *H04R 2400/11* (2013.01)

(58) Field of Classification Search
CPC ......... H04R 7/22; H04R 9/06; H04R 2400/11
See application file for complete search history.

(56) References Cited

U.S. PATENT DOCUMENTS

| | | | | |
|---|---|---|---|---|
| 4,598,178 A | 7/1986 | Rollins | | |
| 7,822,222 B2 * | 10/2010 | Funahashi ................ | H04R 7/18 | 181/173 |

(Continued)

FOREIGN PATENT DOCUMENTS

| | | |
|---|---|---|
| GB | 1217650 A | 6/1919 |
| JP | 35-15603 U | 7/1960 |

(Continued)

OTHER PUBLICATIONS

Communication dated Sep. 26, 2017 from the Japanese Patent Office in counterpart Application No. 2016-222905.

(Continued)

*Primary Examiner* — Brian Ensey
(74) *Attorney, Agent, or Firm* — Sughrue Mion, PLLC

(57) ABSTRACT

A speaker device includes: a diaphragm that radiates sound; an edge arranged in an outer periphery of the diaphragm; an attachment part facing an outer peripheral region of the edge; and a connecting member held between the outer peripheral region of the edge and the attachment part, wherein the connecting member is adhered to at least one of the outer peripheral region or the attachment part, and the edge has a curved portion convexly curved on a sound radiation side.

8 Claims, 3 Drawing Sheets

Related U.S. Application Data

Jun. 29, 2017, now Pat. No. 9,900,699, which is a continuation of application No. 15/338,985, filed on Oct. 31, 2016, now Pat. No. 9,729,972, which is a continuation of application No. 14/781,363, filed as application No. PCT/JP2013/059966 on Apr. 1, 2013, now Pat. No. 9,510,099.

(56) References Cited

U.S. PATENT DOCUMENTS

| | | | |
|---|---|---|---|
| 2004/0109582 | A1 | 6/2004 | Sugiura et al. |
| 2007/0145637 | A1 | 6/2007 | Sato et al. |
| 2011/0222721 | A1 | 9/2011 | Matsuda et al. |

FOREIGN PATENT DOCUMENTS

| | | | |
|---|---|---|---|
| JP | 48031320 | Y | 9/1973 |
| JP | 50-145339 | U | 12/1975 |
| JP | 56-168496 | A | 12/1981 |
| JP | 62-98396 | A | 5/1987 |
| JP | 01-177694 | U | 12/1989 |
| JP | 03085900 | A | 4/1991 |
| JP | 2001-036987 | A | 2/2001 |
| JP | 2006-229643 | A | 8/2006 |
| JP | 2007-174603 | A | 7/2007 |
| JP | 2010-178006 | A | 8/2010 |
| JP | 2010258537 | A | 11/2010 |
| JP | 2011-142502 | A | 7/2011 |

OTHER PUBLICATIONS

International Search Report of PCT/JP2013/059966 dated May 7, 2013 [PCT/ISA/210].

Notice of Reasons for Refusal dated May 7, 2019 from the Japanese Patent Office in application No. 2018-107381.

Written Opinion of PCT/JP2013/059966 dated May 7, 2013 [PCT/ISA/237].

Pinfold, Harold Charles. Moving Coil Loudspeaker. UK Patent Application GB 2127650 A (Year: 1984).

* cited by examiner

SPEAKER DEVICE

CROSS-REFERENCE TO RELATED APPLICATIONS

This application is a continuation of U.S. application Ser. No. 18/305,619, filed on Apr. 24, 2023, which is a continuation application of U.S. application Ser. No. 17/716,736, filed on Apr. 8, 2022, issued Jun. 6, 2023, as U.S. Pat. No. 11,671,758, which is a continuation application of U.S. application Ser. No. 17/069,439, filed on Oct. 13, 2020, issued May 17, 2022, as U.S. Pat. No. 11,337,004, which is a continuation application of Ser. No. 16/542,614, filed on Aug. 16, 2019, issued Nov. 17, 2020, as U.S. Pat. No. 10,841,705, which is a continuation application of Ser. No. 15/882,137, filed on Jan. 29, 2018, issued Oct. 1, 2019, as U.S. Pat. No. 10,433,065, which is a continuation application of Ser. No. 15/637,338, filed on Jun. 29, 2017, issued Feb. 20, 2018, as U.S. Pat. No. 9,900,699, which is a continuation application of Ser. No. 15/338,985, filed on Oct. 31, 2016, issued Aug. 8, 2017, as U.S. Pat. No. 9,729,972, which is a continuation application of Ser. No. 14/781,363, filed on Sep. 30, 2015, issued Nov. 29, 2016, as U.S. Pat. No. 9,510,099, which is a National Stage Application under 35 U.S.C. § 371 of International Application No. PCT/JP2013/059966, filed on Apr. 1, 2013.

TECHNICAL FIELD

The present invention relates to a speaker device.

BACKGROUND ART

Conventionally, a speaker device, for example, mounted on an audio apparatus such as a headphone is known (for example, refer to PTL 1). Many of the speaker devices include: a diaphragm that radiates sound; an edge arranged in an outer periphery of the diaphragm; and a frame arranged in an outer periphery of the edge.

FIG. 1 shows an example of a conventional speaker device.

In this speaker device 50 shown in FIG. 1, an outer peripheral region 51*a* of a diaphragm 51 is attached to an inner peripheral region 52*a* of an edge 52, and an outer peripheral region 52*b* of the edge 52 is connected to an attachment part 53*a* arranged in a frame 53. A flexible part 52*c* is provided between the outer peripheral region 52*b* and the inner peripheral region 52*a* of the edge 52. Owing to the flexibility of this flexible part 52*c*, the diaphragm 51 is vibratably coupled to the frame 53 via the edge 52.

Here, for obtaining good flexibility at the flexible part 52*c*, the edge 52 is often made of relatively soft resin, rubber based member, or the like. In contrast, for supporting contents in such as a magnetic circuit, the frame 53 is often made of relatively hard resin, metal, or the like. In this way, in many cases, the edge 52 and the frame 53 are made of different materials.

Adhesion by adhesive is often employed when connecting the outer peripheral region 52*b* of the edge 52 to the attachment part 53*a* of the frame 53. At this time, depending on a combination of materials of the edge 52 and the frame 53, sometimes desired adhesion strength cannot be attained when adhering the outer peripheral region 52*b* of the edge 52 directly to the attachment part 53*a* of the frame 53.

Therefore, as shown in FIG. 1, it is proposed that a connecting member 54 with which a good adhesion strength can be attained with respect to both the outer peripheral region 52*b* of the edge 52 and the attachment part 53*a* of the frame 53, for example, made of paper, resin, or the like is arranged between the outer peripheral region 52*b* of the edge 52 and the attachment part 53*a* of the frame 53 (for example, refer to PTL 2).

By the way, these days, on one hand, a demand of reducing a size of a speaker device is increased. On the other hand, from an aspect of sound quality, there is a demand of widening a breadth of a diaphragm and a breadth of an edge as much as possible.

In response to these demands, for example, in a speaker device 50 shown in FIG. 1, when reducing the size of the speaker device 50 without sacrificing the breadths of the diaphragm 51 and the edge 52, sometimes a width of adhesion margin between the outer peripheral region 52*b* of the edge 52 and the attachment part 53*a* becomes, for example, less than 1 mm. In such a case, a width of the connecting member 54 often becomes less than 1 mm conforming to this width of adhesion margin.

CITATION LIST

Patent Literature

[PTL 1]
JP S62-98396A
[PTL 2]
JP 2001-36987A

SUMMARY OF INVENTION

Technical Problem

However, in many cases, an operation of making the outer peripheral region of the edge adhere to the attachment part of the frame sandwiching a slim connecting member of which a width is, for example, less than 1 mm is difficult in a production process.

For this reason, in the speaker device shown in FIG. 1, when reducing a size of the speaker device without sacrificing the breadths of the diaphragm and the edge, as an example, there is a problem a desired strength may not be attained in the connection between the outer peripheral region of the edge and the attachment part of the frame. Incidentally, as an example of a slim connecting member, the member having a width less than 1 mm is exemplified, but a size less than 1 mm is just an example, and the above problem may occur even with the connecting member having a width more than 1 mm depending on a condition such as material of the edge.

Accordingly, an object of the present invention is to provide a speaker device with which high strength can be obtained for a connection between an outer peripheral region of an edge and an attachment part of a frame, even while reducing a size of the speaker device without sacrificing a breadth of a diaphragm and the edge.

Solution to Problem

For solving the above problems, according to one aspect of the present invention, there is provided a speaker device comprising:

a diaphragm that radiates sound;

an edge arranged in an outer periphery of the diaphragm;

a frame arranged in an outer periphery of the edge, and including an annular attachment part connected to an outer peripheral region of the edge; and an annular connecting member arranged between the outer peripheral region and the attachment part and adhered to the outer peripheral region and the attachment part, wherein a width of the connecting member is greater than a width of the outer peripheral region, and an inner diameter of the connecting member is less than an inner diameter of the edge.

DESCRIPTION OF EMBODIMENTS

Figure 1:
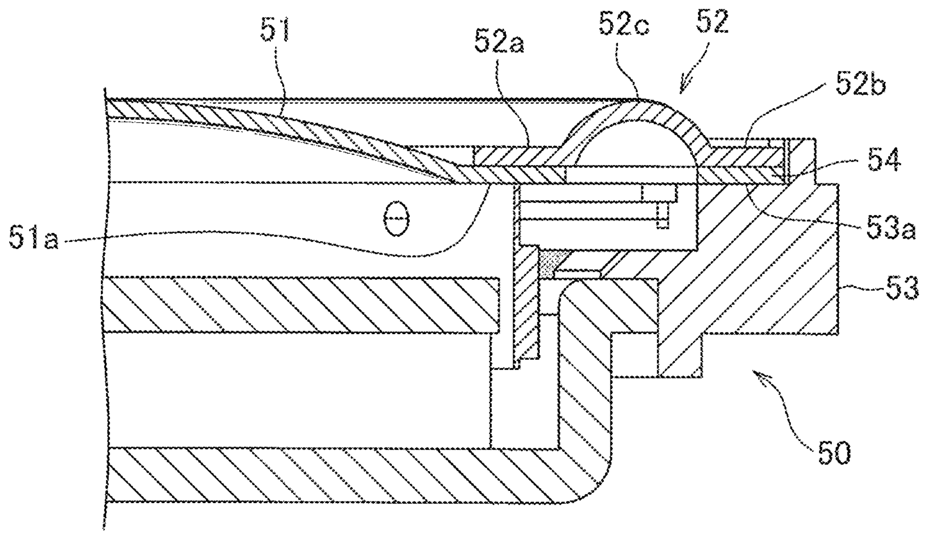
FIG. 1 PRIOR ART
FIG. 1 is a view showing an example of a conventional speaker device.

Hereinafter, a speaker device according to a first embodiment of the present invention will be explained. The speaker device according to the first embodiment of the present invention includes: a diaphragm that radiates sound; and an edge arranged in an outer periphery of the diaphragm. This speaker device further includes: a frame arranged in an outer periphery of the edge, and including an annular attachment part connected to an outer peripheral region of the edge; and an annular connecting member arranged between the outer peripheral region and the attachment part and adhered to the outer peripheral region and the attachment part. Further, in this speaker device, a width of the connecting member is greater than a width of the outer peripheral region, and an inner diameter of the connecting member is less than an inner diameter of the edge. In this speaker device, by using such a wide connecting member, difficulty in a production process is reduced in particular, with respect to adhesion between the outer peripheral region of the edge and the connecting member. Eventually, the difficulty in a production process is reduced with respect to connection between the outer peripheral region of the edge and the attachment part of the frame. As a result, high strength can be obtained for the connection between the outer peripheral region of the edge and the attachment part of the frame, even while reducing a size of the speaker device without sacrificing a breadth of the diaphragm and the edge.

Further, it is preferable that the width of the connecting member is greater than a width of the attachment part, and the inner diameter of the connecting member is less than an inner diameter of the attachment part. Thereby, difficulty in a production process is reduced also with respect to adhesion between the connecting member and the attachment part of the frame. Eventually, the difficulty in a production process is further reduced with respect to connection between the outer peripheral region of the edge and the attachment part of the frame, and higher strength is obtained for this connection.

Further, it is preferable that an outer diameter of the connecting member is substantially the same as an outer diameter of the edge. Thereby, for example, in comparison to a case that an outer periphery of the connecting member and an outer periphery of the edge are largely misaligned with each other, positioning accuracy of the edge with respect to the frame can be improved.

Further, it is preferable that the outer diameter of the connecting member is substantially the same as an outer diameter of the attachment part. Thereby, for example, in comparison to a case that an outer periphery of the connecting member and an outer periphery of the attachment part are largely misaligned with each other, positioning accuracy of the edge with respect to the frame at the time of manufacturing can be improved.

Further, it is possible that the connecting member is adhered to a face of the attaching part at a sound radiating side, and adhered to a face of the outer peripheral region of the edge opposite to the sound radiating side. Thereby, an operator can start an adhesion operation in an access direction easy for the operator such as mounting the outer peripheral region of the edge adhered to the connecting member on the attachment part of the frame from above.

Further, it is possible that the speaker device has a magnetic circuit, and a voice coil for vibrating the diaphragm by supplying a sound signal and by receiving an action from the magnetic circuit with the following embodiment. Namely, the frame may be provided with a ventilation hole for moving back and forth an air between a space an outside of the frame and a space surrounded by a face of the edge opposite to the sound radiating side, an outer face of the voice coil, and an inner face of the frame. Owing to provide such a ventilation hole in the frame, when the diaphragm is vibrated, the ventilation property between the above space and an outside of the space is ensured, and a temperature increase of the magnetic circuit is suppressed. Here, owing to use a wide connecting member like above, the difficulty in a production process is reduced with respect to adhesion between the outer peripheral region of the edge and the attachment part of the frame. For this reason, in prospect of such a difficulty reduction, for example, it is possible to widen the above space in the frame by narrowing slightly the width of the attachment part. As a result, by forming the above ventilation hole larger, it is possible to increase the ventilation property of the air between the above space and the outside of the space.

Embodiment

A speaker device 10 according to a first embodiment of the present invention will be explained with respect to FIGS. 2 and 3.

Figure 2A:
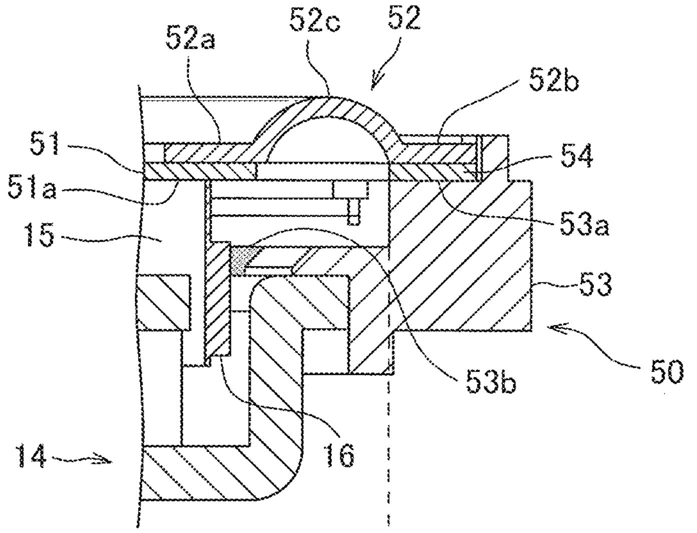
FIG. 2A PRIOR ART
FIG. 2A is a view of the conventional speaker device of FIG. 1.
Figure 2B:
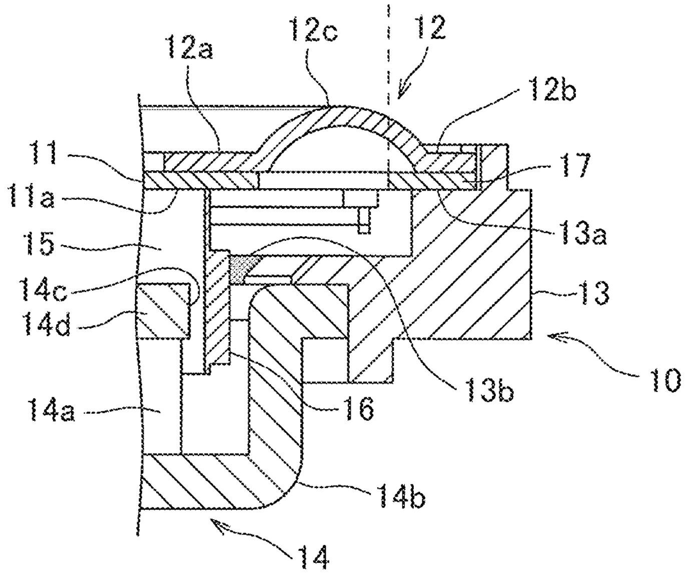
FIG. 2B is a view showing a speaker device of a first embodiment.

FIG. 2A shows a conventional speaker device 50 shown in FIG. 1 for comparing with the speaker device 10 according to the first embodiment. Further, FIG. 2B shows the speaker device 10 according to the first embodiment. FIG. 3 shows an enlarged view of a connection point between an edge 12 and a frame 13 in the speaker device 10 shown in FIG. 2B.

Incidentally, in FIG. 2A, components equal to components of the speaker device 10 according to the first embodiment shown in FIG. 2B such as a magnetic circuit are denoted the same reference signs as FIG. 2B. Hereinafter, these same components are only explained with an explanation of the speaker device 10 according to the first embodiment, and an explanation of the conventional speaker device 50 is omitted.

As shown in FIG. 2, the speaker device 10 includes: a diaphragm 11; the edge 12; the frame 13; a magnetic circuit 14; a voice coil bobbin 15; and a voice coil 16.

The speaker device 10 is so-called a dome type speaker device in which the diaphragm generation sound has a dome shape. The edge 12 is arranged in an outer periphery of the diaphragm 11, and the frame 13 is arranged in an outer periphery of the edge 12.

In the speaker device 10, an outer peripheral region 11*a* of the diaphragm 11 is overlapped with and adhered to a face opposite to sound radiating side in an inner peripheral region 12*a* of the edge 12. Further, an outer peripheral region 12*b* of the edge 12 is connected to an attachment part 13*a* arranged in the frame 13 at the sound radiating side. The attachment part 13*a* is an annular depression arranged in an inner side of the frame 13 at an end of the sound radiating side. The outer peripheral region 12*b* of the edge 12 is fitted into this attachment part 13*a*. A flexible part 12*c* curved toward the sound radiating side is provided in between the outer peripheral region 12*b* and the inner peripheral region 12*a* of the edge 12. Owing to flexibility of the flexible part 12*c*, the diaphragm 11 is vibratably connected to the frame 13 via the edge 12. In this embodiment, the edge 12 is an up roll type edge in which the flexible part 12*c* is curved toward the sound radiating side as above.

The magnetic circuit 14 includes: a magnet 14*a*; a yoke 14*b* through which a magnetism from the magnet 14*a* is passed; and a plate 14*d*. An outer periphery of the yoke 14*b* is fixed to an inner wall of the frame 13. An annular magnetic gap 14*c* is provided in between the yoke 14*b* and the plate 14*d*. The voice coil 16 wound around the voice coil bobbin 15 is received in the magnetic gap 14*c*. A face of the outer peripheral region 11*a* of the diaphragm 11 opposite to the voice radiating side is fixed to an end of the voice coil bobbin 15 at the voice radiating side.

When an audio signal is supplied to the voice coil 16, a Lorentz force by the magnetism from the magnet circuit 14 acts on the voice coil 16 according to the audio signal. As a result, the voice coil 16 is vibrated, and this vibration is transmitted to the diaphragm 11 via the voice coil bobbin 15. Then, the diaphragm 11 vibrates to radiate sound.

The diaphragm 11 shown in FIG. 2B corresponds to an example of the diaphragm in claims. The edge 12 corresponds to an example of the edge in claims. The frame 13 corresponds to an example of the frame in claims. Further, the magnetic circuit 14 corresponds to an example of the magnetic circuit in claims. The voice coil 16 corresponds to an example of the voice coil in claims. The frame 13 corresponds to an example of the frame in claims.

Further, the frame 13 is provided with a ventilation hole 13*b* for moving back and forth an air between an outside of the frame 13 and a space surrounded by a face of the edge 12 opposite to the sound radiating side, an outer face of the voice coil 16, and an inner face of the frame 13. Owing to this ventilation hole 13*b*, when the diaphragm 11 is vibrated, the ventilation property between the above space and an outside of the space is ensured, and a temperature increase of the magnetic circuit 14 is suppressed. Incidentally, in FIG. 2, a part of the ventilation hole 13*b* which is not hidden by the voice coil bobbin 15 and the voice coil 16 is shown.

Here, for obtaining good flexibility of the flexible part 12*c*, the edge 12 is made of relatively soft resin, rubber member, or the like. In contrast, for holding the magnetic circuit 14, the frame 13 is made of relatively hard resin, metal, or the like. Further, a connecting member 17 is caught between the outer peripheral region 12*b* of the edge 12 and the attachment part 13*a* of the frame 13. The connecting member 17 is made in an annular shape of, for example, paper or resin for obtaining good adhesive strength with respect to both the outer peripheral region 12*n* of the edge 12 and the attachment part 13*a*. The connecting member 17 is adhered to a face of the attachment part 13*a* in the sound radiating side and to a face of the outer peripheral region 12*b* of the edge 12 opposite to the sound radiating side.

A production process in this embodiment will be described. First, the outer peripheral region 11*a* of the diaphragm 11 is adhered to the inner peripheral region 12*a* of the edge 12. Further, the connecting member 17 is adhered to a face of the outer peripheral region 12*b* of the edge 12 opposite to the sound radiating side. Then, the edge 12 equipped with the connecting member 17 is arranged on and adhered to a face of the attachment part 13*a* of the frame 13 at the sound radiating side. According to the speaker device 10 of this embodiment, the outer peripheral region 12*b* of the frame 12 is connected to the attachment part 13*a* by an adhesion operation from an access direction easy for an operator as such.

Figure 3:
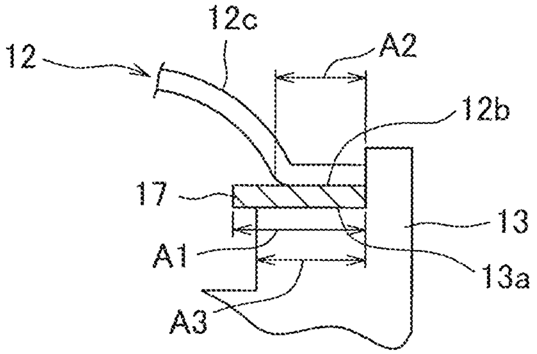
FIG. 3 is an enlarged view showing an adhesion position of an edge and a frame in the speaker device of the first embodiment.

In this embodiment, as shown in FIG. 3, a width A1 of the connecting member 17 is larger than a width A2 of the outer peripheral region 12*b* of the edge 12, and projected toward an inner peripheral side of the edge 12. Further, the width A1 of the connecting member 17 is larger than a width A3 of the attachment part 13*a* of the frame 13, and projected toward an inner peripheral side of the attachment part 13*a*.

Further, an outer diameter of the connecting member 17 is formed substantially equal to an outer diameter of the edge 12. As a result, an outer edge of the connecting member 17 is substantially aligned to an outer edge of the edge 12. Further, this outer diameter of the connecting member 17 is substantially equal to an outer diameter of the attachment part 13*a* remaining a gap to an inner wall of the frame 13. Thereby, the outer edge of the connecting member 17 is substantially aligned to an outer edge of the attachment part 13*a*.

Here, the conventional speaker 50 shown in FIG. 2A is reduced a size, and when the size is reduced, a size of the diaphragm 51 and a size of the flexible part 52*c* are reduced. Thereby, adhesion margin between the outer peripheral region 52*b* of the edge 52 and the attachment part 53*a* of the frame 53 is prevented from being reduced. Further, in this conventional speaker device 50, a width of the connecting member 54 is substantially equal to a width of the outer peripheral region 52*b* of the edge 52, and substantially equal to a width of the attachment part 53*a*.

In contrast, in the speaker device 10 according to this embodiment as shown in FIG. 2B, while the diaphragm 11 is substantially as wide as the diaphragm 51 of the conventional speaker device 50, and the flexible part 12*c* of the edge 52 is as wide as desired, a size of the speaker device 10 is reduced. Thereby, a width of the outer peripheral region 12*b* of the edge 12 is smaller than a width of the outer peripheral region 52*b* of the edge 52 of the conventional speaker device 50. Further, in accordance with this, a width of the attachment part 13*a* of the frame 13 is smaller than a width of the attachment part 53*a* of the frame 53 of the conventional speaker device 50. Meanwhile, a width of the connecting member 17 is still wide and substantially equal to a width of the connecting member 54 of the conventional speaker device 50.

As described above, in the conventional speaker device 50, the width of the connecting member 54 is substantially equal to the width of the outer peripheral region 12*b*, and to the width of the attachment part 53*a* of the edge 52. Therefore, when a size of the speaker device 50 is reduced without sacrificing the breadth of the flexible part 52*c* of the edge 52 like the speaker device 10 of this embodiment, the width of the connecting member 54 is narrow and substantially equal to the width of the outer peripheral region 52*b* and to the width of the attachment part 53*a*. When the size of the speaker device 50 is reduced without sacrificing the breadth of the diaphragm and the flexible part 52*c* of the edge 52, the width of the connecting member 54 may be less than 1 mm. It may be difficult in a production process to connect the outer peripheral region 52*b* of the edge 52 to the attachment part 53*a* of the frame 53 via the slim connecting member 54 having less than 1 mm width. Further, when the width of the connecting member 54 is narrow, a problem may be generated that high strength cannot be obtained with respect to the connection between the outer peripheral region 52*b* of the edge 52 and the attachment part 53*a* of the frame 53. Incidentally, as an example of the slim connecting member, the connecting member having less than 1 mm width is exemplified here. However, a size less than 1 mm is just an example, and the above problem may be generated even the width of the connecting member is more than 1 mm depending on a condition such as material of the edge 52. For avoiding the above problem, as described above, the width of the flexible part 52*c* of the edge 52 is reduced, and thereby the width of the connecting member 54 is prevented from being reduced.

In contrast, in the speaker device 10 of this embodiment as shown in FIG. 2B, while a size of the speaker device 10 is reduced without sacrificing the breadth of the flexible part 12*c* of the edge 12, the width of the connecting member 17 is wide and substantially equal to the width of the connecting member 54 of the conventional speaker device 50. Thereby, in the speaker device 10 of this embodiment, the width of the connecting member 17 is wider than the width of the outer peripheral region 12*b* of the edge 12, and projected toward an inner peripheral side of the edge 12. In the speaker deice 10, owing to using such a wide connecting member 17, firstly, the difficulty in a production process is reduced with respect to adhesion between the outer peripheral region 12*b* of the edge 12 and the connecting member 17. Then, the difficulty in a production process is reduced with respect to connection between the outer peripheral region 12*b* of the edge 12 and the attachment part 13*a* of the frame 13. As a result, in this embodiment, high strength can be obtained for the connection between the outer peripheral region 12*b* of the edge 12 and the attachment part 13*a* of the frame 13, even while reducing a size of the speaker device 10 without sacrificing the breadth of the flexible part 12*c* of the edge 12.

Further, in the speaker device 10 of this embodiment, the width of the connecting member 17 is wider than the width of the attachment part 13*a*, and projected toward an inner peripheral side of the attachment part 13*a*. Thereby, in this speaker device 10, the difficulty in a production process is also reduced with respect to adhesion between the connecting member 17 and the attachment part 13*a* of the frame 13. Then, the difficulty in a production process is further reduced with respect to connection between the outer peripheral region 12*b* of the edge 12 and the attachment part 13*a*, and higher strength is obtained for this connection.

Further, as described above, in the speaker device 10 of this embodiment, the outer diameter of the connecting member 17 is formed substantially equal to the outer diameter of the edge 12. Thereby, the outer edge of the connecting member 17 is substantially aligned to the outer edge of the edge 12. As a result, in the speaker device 10 of this embodiment, the positioning accuracy of the edge 12 with respect to the frame 13 at the time of manufacturing can be improved in comparison to, for example, a case that an outer periphery of the connecting member 17 and an outer periphery of the edge 12 are largely misaligned with each other.

Further, as described above, in the speaker device 10 of this embodiment, the outer diameter of the connecting member 17 is substantially equal to the outer diameter of the attachment part 13*a*. Thereby, the outer edge of the connecting member 17 is substantially aligned to an outer edge of the attachment part 13*a*. As a result, in the speaker device 10 of this embodiment, the positioning accuracy of the edge 12 with respect to the frame 13 at the time of manufacturing can be improved in comparison to, for example, a case that an outer periphery of the attachment part 13*a* and an outer periphery of the connecting member 17 are largely misaligned with each other.

Further, in the speaker device 10 of this embodiment, the ventilation hole 13*b* for moving back and forth an air between a space surrounded by a face of the edge 12 opposite to the sound radiating side, an outer face of the voice coil 16, and an inner face of the frame 13, and an outside of the frame 13 is arranged to suppress a temperature increase of the magnetic circuit 14.

The frame 53 of the conventional speaker device 50 shown in FIG. 2A is also provided with a similar ventilation hole 53*b*. However, in this embodiment, the width of the attachment part 13*a* of the frame 13 is reduced corresponding to the width of the outer peripheral region 12*b* of the frame 12. As a result, in this embodiment, a space where an air moved back and forth the ventilation hole 13*b* remains is larger than a similar space in the conventional speaker device 50. In response to this, in this embodiment, the ventilation hole 13*b* is formed larger than the ventilation hole 53*b* of the conventional speaker device 50. Thereby, in this embodiment, the ventilation property of the air in the above space is increased, and the temperature increase of the magnetic circuit 14 is suppressed in comparison to the conventional speaker device 50.

With that, the explanation of the speaker device 10 according to the first embodiment is finished, and next, a speaker device according to a second embodiment will be explained with reference to FIG. 4.

Figure 4A:
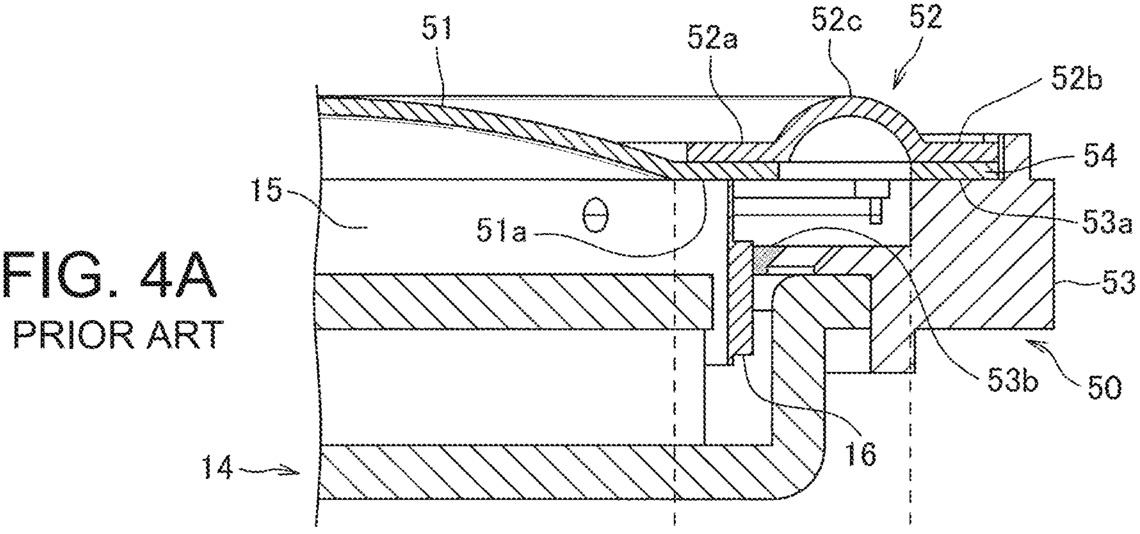
FIG. 4A PRIOR ART
FIG. 4A is a view of the conventional speaker device of FIG. 1
Figure 4B:
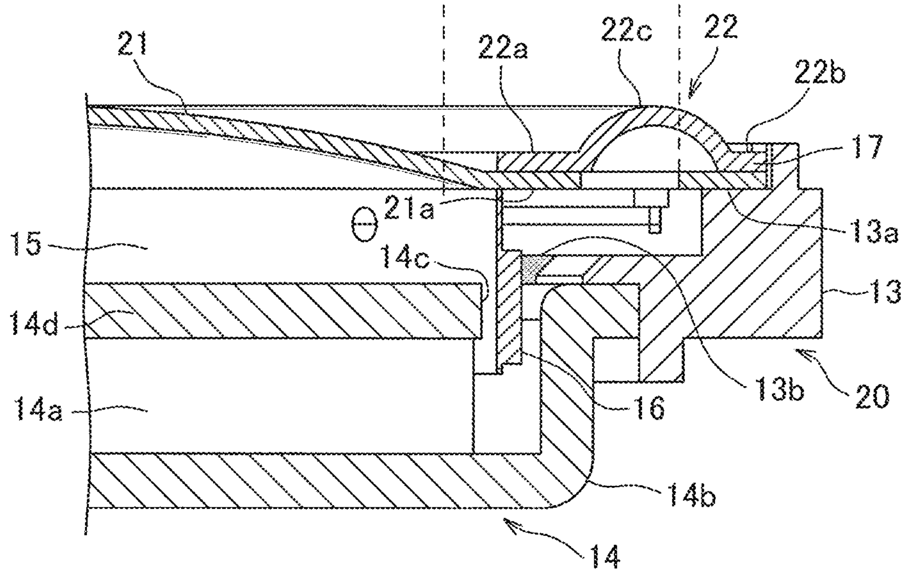
FIG. 4B is a view showing a speaker device of a second embodiment.

FIG. 4A shows a conventional speaker device 50 shown in FIG. 1 for comparing with a speaker device 20 according to the second embodiment. Further, FIG. 4B shows the speaker device 20 according to the second embodiment.

Shapes of a diaphragm 21 and an edge 22 of the speaker device 20 of the second embodiment are different from those of the speaker device 10 of the first embodiment. Hereinafter, differences between the speaker device 20 of the second embodiment and the speaker device 10 of the first embodiment will be focused and explained. Incidentally, in FIG. 4B, components as same as the components of the speaker device 10 of the first embodiment are denoted by the same reference signs. Hereinafter, explanations of these same components are omitted.

In the speaker device 20 of the second embodiment, while a breadth of a flexible part 22*c* is nearly equal to the breadth of the flexible part 52*c* of the conventional speaker device 50, and a desired breadth of the diaphragm 21 is ensured, a size of the speaker device 20 is reduced. Thereby, a position of the outer peripheral region 21*a* of the diaphragm 21 is shifted toward the frame 13 side in comparison to a position of the outer peripheral region 51*a* of the diaphragm 51 of the conventional speaker device 50. In accordance with this, in this embodiment, a position of the flexible part 22*c* is shifted toward the frame 13 side in comparison to a position of the flexible part 52*c* of the conventional speaker device 50. As a result, a width of an outer peripheral region 22*b* of the edge 22 is narrower than a width of the outer peripheral region 52*b* of the edge 52.

Then, this outer peripheral region 22*b* having a narrow width is connected to the attachment part 13*a* of the frame 13 via the wide connecting member 17 like the first embodiment. Thereby, the difficulty in a production process is reduced with respect to connection of the outer peripheral region 22*b* of the edge 22 to the attachment part 13*a* via the connecting member 17. As a result, in this embodiment, high strength can be obtained for the connection between the outer peripheral region 22*b* of the edge 22 and the attachment part 13*a* of a frame 3, even while reducing a size of the speaker device 20 without sacrificing a breadth of the diaphragm 21.

With that, the explanation of the speaker device 20 according to the second embodiment is finished, and next, a speaker device 30 according to a third embodiment will be explained with reference to FIG. 5.

Shapes of an edge 32 and an attachment part 33*a* of a frame 33 of the speaker device 30 of the third embodiment are different from those of the speaker device 10 of the first embodiment. Hereinafter, differences between the speaker device 30 of the third embodiment and the speaker device 10 of the first embodiment will be focused and explained.

Figure 5:
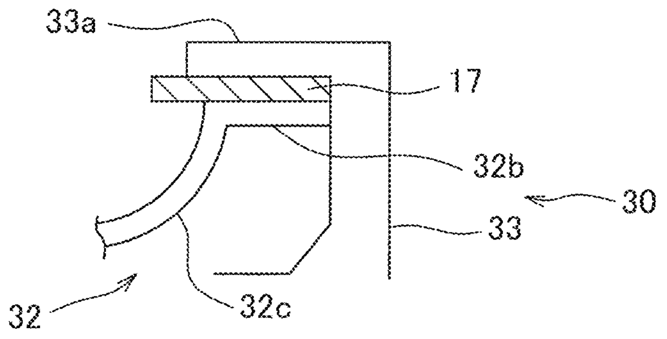
FIG. 5 is a view showing a speaker device of a third embodiment focusing on an adhesion position of the edge and the frame.

FIG. 5 shows an enlarged view of an adhesion position of the edge 32 and the frame 33 in the speaker device 30 of the third embodiment. Incidentally, in FIG. 5, the connecting member, which is one of the same components as the components of the speaker 10 of the first embodiment shown in FIG. 2B, is denoted by the same reference sign as FIG. 2B. Hereinafter, explanations of the same components including the connecting member 17 as the components of the speaker device 10 of the first embodiment are omitted.

As shown in FIG. 5, in the third embodiment, the edge 32 is a down roll type edge in which a flexible part 32*c* is curved toward a side opposite to the sound radiating side. Further, an annular attachment part 33*a*, to which an outer peripheral region 32*b* of the edge 32 is attached, is projected from an inner wall of the frame 33. The outer peripheral region 32*b* of the edge 32 is attached to a face of the attachment part 33*a* opposite to the sound radiating side via the connecting member 17.

It goes without saying that in this speaker 30 of the third embodiment, by using the wide connecting member 17 like the first embodiment, high strength can be also obtained for the connection between the outer peripheral region 32*b* of the edge 32 and the attachment part 33*a* like the first embodiment.

Incidentally, in the above embodiments, "annular" is not specified. However, "annular" used here includes any shapes forming "ring" such as a ring shape, an oval-shape, a track shape, and a rectangular ring shape.

Further, in the above embodiments, a doom type is exemplified as a type of the speaker device. However, the speaker device is not limited to this, and for example, may be other type speaker device such as cone type.

Further, in the above embodiments, regarding adhesion between the outer peripheral region of the diaphragm and the inner peripheral region of the edge, the embodiment of adhesion between the face of the outer peripheral region of the diaphragm at the sound radiating side and a face of the inner peripheral region of the edge opposite to the sound radiating side is exemplified. However, the adhesion between the outer peripheral region of the diaphragm and the inner peripheral region of the edge is not limited to this embodiment, and for example, may be an embodiment of adhesion between a face of the outer peripheral region of the diaphragm opposite to the sound radiating side and a face of the inner peripheral region of the edge at the sound radiating side.

Further, in the above embodiments, the speaker device in which the voice coil bobbin around which the voice coil is wound is fixed to the diaphragm is exemplified. However, the speaker device is not limited to this. For example, the voice coil may be directly fixed to the diaphragm. Further, for example, the voice coil and the voice coil bobbin may be fixed to the edge.

Further, in the above embodiments, the speaker device of which size is reduced without sacrificing the breadth of any one of the diaphragm or the edge is exemplified. However, the speaker device is not limited to this. A size of the speaker device may be reduced without sacrificing the breadth of both the diaphragm and the edge.

Incidentally, the above embodiments only show typical embodiments of the present invention, and the present invention is not limited to these embodiments. Namely, various modifications can be carried out within the scope of the present invention by a skilled person according to conventional well-known knowledge. These modifications are still within the scope of the present invention as long as they are provided with a configuration of the speaker device of the present invention.

REFERENCE SIGNS LIST

10, 20, 30, 50 speaker device
11, 21, 51 diaphragm
11*a*, 21*a*, 51*a* outer peripheral region
12, 22, 32, 52 edge
12*a*, 22*a*, 52*a* inner peripheral region
12*b*, 22*b*, 32*b*, 52*b* outer peripheral region
12*c*, 22*c*, 32*c*, 52*c* flexible part
13, 33, 53 frame
13*b*, 53*b* ventilation hole
13*a*, 33*a*, 53*a* attachment part
14 magnetic circuit
15 voice coil bobbin
16 voice coil
17, 54 connecting member

The invention claimed is:

1. A speaker device comprising:
a diaphragm that radiates sound;
an edge arranged in an outer periphery of the diaphragm;
an attachment part facing an outer peripheral region of the edge; and
a connecting member held between the outer peripheral region of the edge and the attachment part,
wherein the connecting member is adhered to at least one of the outer peripheral region or the attachment part,
wherein the edge has a curved portion convexly curved on a sound radiation side, and
wherein a width of the connecting member is larger than a width of the attachment part.

2. The speaker device as claimed in claim 1,
wherein the width of the connecting member is larger than a width of the outer peripheral region of the edge.

3. The speaker device as claimed in claim 1,
wherein the curved portion is flexible.

4. The speaker device as claimed in claim 1,
wherein only one curved portion is provided on the edge.

5. A speaker device comprising:
a diaphragm that radiates sound;
an edge arranged in an outer periphery of the diaphragm;

an attachment part facing an outer peripheral region of the edge; and a connecting member held between the outer peripheral region of the edge and the attachment part, wherein the connecting member is adhered to at least one of the outer peripheral region or the attachment part, the edge has a curved portion convexly curved on a side opposite to a sound radiation side, and wherein a width of the connecting member is larger than a width of the attachment part.

6. The speaker device as claimed in claim 5, wherein the width of the connecting member is larger than a width of the outer peripheral region of the edge.

7. The speaker device as claimed in claim 5, wherein the curved portion is flexible.

8. The speaker device as claimed in claim 5, wherein only one curved portion is provided on the edge.

* * * * *